US012634644B2

(12) United States Patent
Rakshit et al.

(10) Patent No.: US 12,634,644 B2
(45) Date of Patent: May 19, 2026

(54) COCHLEAR IMPLANT SYSTEM AND METHOD

(71) Applicant: International Business Machines Corporation, Armonk, NY (US)

(72) Inventors: Sarbajit K. Rakshit, Kolkata (IN); Katsuyuki Sakuma, Fishkill, NY (US); Amos Cahan, Dobbs Ferry, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 17/937,702

(22) Filed: Oct. 3, 2022

(65) Prior Publication Data

US 2024/0114302 A1 Apr. 4, 2024

(51) Int. Cl.
*H04R 25/00* (2006.01)

(52) U.S. Cl.
CPC ......... *H04R 25/606* (2013.01); *H04R 25/305* (2013.01)

(58) Field of Classification Search
CPC ... H04R 25/606; H04R 25/305; H04R 17/005
USPC ........................................................ 381/60
See application file for complete search history.

(56) References Cited

U.S. PATENT DOCUMENTS 5,889,847 A 3/1999 Copley et al.
6,549,814 B1 4/2003 Strutz et al.
7,289,639 B2 10/2007 Abel et al.
7,618,450 B2 11/2009 Zarowski et al.
7,797,051 B2 9/2010 Klefenz
9,313,587 B2 4/2016 Bernhard et al.
2009/0030486 A1 1/2009 Klefenz
2014/0194673 A1 7/2014 Goldenberg et al.

FOREIGN PATENT DOCUMENTS

CN 1401395 A 3/2003
EP 1173044 A2 * 1/2002 ......... A61N 1/36036
JP 2008177854 A 7/2008

OTHER PUBLICATIONS

EP 1173044 A2 Implantable System for the Rehabilitation of a hearing disorder. English Translation (Year: 2002).*

(Continued)

*Primary Examiner* — Phylesha Dabney
(74) *Attorney, Agent, or Firm* — Gavin Giraud, Esq; Kevin P. Radigan, Esq.; Heslin Rothenberg Farley & Mesiti P.C.

(57) ABSTRACT

Method and system for a cochlear implant that includes receiving, by a processor, an electric audio signal; processing, by the processor, the electric audio signal, thereby providing a processed electric audio signal; receiving, by a transducer driver, the processed electric audio signal; transmitting, by the transducer driver, the processed electric audio signal to electro-acoustic transducer elements that are at least arranged within a cochlea; and vibrating at least one electro-acoustic transducer element of the electro-acoustic transducer elements in response to the at least one electro-acoustic transducer element receiving the processed electric audio signal, thereby providing a vibrating stimulus based on the processed electric audio signal.

20 Claims, 12 Drawing Sheets

(56) References Cited

OTHER PUBLICATIONS

Rhonira Latif et al., "Mechanical Energy Sensing and Harvesting in Micromachined Polymer-Based Piezoelectic Transducers for Fully Implanted Hearing Systems: A Review," Journal Polymers 2021, vol. 13, Issue 14, Dated: Jul. 12, 2021, pp. 1-43.
C. R. Perez et al., "PVDF Piezoelectric Nanofibers as Hair Cell Substitutes: A Feasibility Study," Comsol Presentations, Year: 2015, pp. 1-4.
Sheyda Davaria, "Developing Active Artificial Hair Cell Sensors Inspired by the Cochlear Amplifier," Virginia Tech Electronic Theses and Dissertations, Dated: Jan. 26, 2021, pp. 1-257.
H. Christiaan Stronks et al., "Personalizing Transient Noise Reduction Algorithm Settings for Cochlear Implant Users," Ear and Hearing: Nov./Dec. 2021—vol. 42—Issue 6, Dated: Dec. 2021, pp. 1-13.
Need et al., "Machine learning algorithm to improve performance of hearing aids and cochlear implants in reverberant environments," Duke IDF, Date: NA, pp. 1-3.
Author Unknown, "Smartphone App Provides Tinnitus Relief for Cochlear Implant Users," The Hearing Journal vol. 74—Issue 10, Dated: Oct. 2021, pp. 1-4.
Takatoshi Inaoka et al., "Piezoelectric materials mimic the function of the cochlear sensory epithelium," PNAS, vol. 108, No. 45, Dated: Nov. 8, 2011, pp. 18390-18395.
William E. Brownell, "The Piezoelectric Outer Hair Cell," Vertebrate Hair Cells, Springer Handbook of Auditory Research, Year: 2006, pp. 313-347.
Alexander A. Spector et al., "Modes and Balance of Energy in the Piezolectric Cochlear Outer Hair Cell Wall," Journal of Biomechanical Engineering, vol. 126, Dated: Feb. 2004, pp. 17-25.
NHT Staff, "Aging and Hearing Loss I," NHT in the News, Dated: Nov. 26, 2014, pp. 1-3.
"Hair Cell," Wikipedia, Lasted Edited May 26, 2022, pp. 1-10.
HHTM, "Scientists Regenerate Cochlear Hair Cells in Guinea Pigs Using RNA Injection," Hearing Health & Technology Matters, Dated: Apr. 18, 2018, pp. 1-5.
Purnima Sharma, "Artificial Cochlear Epithelium Using A Piezolelectric Membrane," Bionics/biomimeitics, pp. 1-18.
"Neuriscientifically Challenged," Neuroscience Made Simpler, Year: 2022, pp. 1-5.
"Electrodes and Channels," Cochlear Implant HELP, Date Accessed: Sep. 21, 2022, pp. 1-3.
Lily Sue, "Endocrine: Cochlea" Pinterest, Date Accessed: Sep. 21, 2022, pp. 1-2.
"Inner Ear," Hearing Aid Services, Dated: 2010, Dated Accessed: Sep. 21, 2022, pp. 1-3.
H. Debeda et al., "One-step firing for electroded PZT thick films applied to MEMS," IOPScience, Smart Materials and Structures, vol. 24, No. 2, Dated: Jan. 8, 2015, pp. 1-4 [Abstract Only].
Alex Bienaime et al., "Static/dynamic trade-off performance of PZT thick film micro-actuators," IOPScience, Journal of Micromechanics and Microengineering, vol. 25, No. 7, Dated: Jun. 8, 2015, pp. 1-4 [Abstract Only].
Mathworks, "Deflection of Piezoelectric Actuator," MATLAB & Simulink, Date Accessed: Sep. 21, 2022, pp. 1-9 https://www.mathworks.com/help/pde/ug/deflection-of-a-piezoelectric-actuator.html?w.mathworks.com.
Matthias Pleil, "Microcantilevers Learning Module: How Does a Cantilever Work?," Youtube, Dated: Oct. 27, 2015, pp. 1.
Dr. Ryan Clement, "Re-Engineering Hearing: Introduction to Cochlear Implant Design," GE 106: Freshman Engineering 3, Dated: Apr. 30, 2008, pp. 1-35.
Dr. Ibrahim habib Barakat, MD, "Implant Surgery," Cochlear™, Dated Accessed: Sep. 22, 2022, pp. 1-88.
Mr. Mike Pringle FRCS(ORL), "Cochlear Implants: What is a Cochlear Implant?," Ears & Hearing UK, Cochlear Implants, Medel, Cochlear, Advanced Bionics, Neurelec, profound deafness treatment, Year: 2022, pp. 1-6.
Med-El, "Synchrony 2 Cochlear Implant: Intuitive Surgical Handling," Med-El Professional Blog, Dated: Oct. 16, 2019, pp. 1-9.
Med-El, "Synchrony CI: Hearing Implant System: How Do Cochlear Implaints Work?," The SYNCHRONY Cochlear Implant, Youtube, Dated: Dec. 1, 2015, pp. 1-1.
Mohammad Hussain, "MEMS Piezoelectric Cantilever Animation," Youtube, Dated: Dec. 2, 2016, pp. 1-1.
Carmen Emily Yang, "Power Management: What is the Piezolectric Effect?," Electronic Design, Dated: Sep. 16, 2016, pp. 1-14.
Faulhaber, "Applications for Innovative Markets," Faulhaber Drive Systems, Date Accessed: Sep. 23, 2022, Dated: 1-10.
Sachin Gupta, "Surgical Experience with FLEXSoft Cochlear Implant Electrode Arrays: Dr. Sachin Gupta," MED-EL Professionals Blog, Dated: 09.09.2020, pp. 1-8.
"Optical MEMS for Dynamic Lighting," Smart Lighting Engineering Research Center, Date Accessed: Sep. 23, 2022, pp. 1-2.
"Bimorph MFC Actuator," Youtube, Dated: Nov. 15, 2013, pp. 1.
U. Baran et al., "A Built-in Vibration Sensor Using Arc-Discharged Reactive lon Plated PZT," IEEJ Transactions on Sensors and Micromachines, Dated: Mar. 2011, pp. 1-3.
M. Morita et al., "Study on Design of Micro-Stirrer for Thrombus Dissolution," Microsyst Technol, Year: 2008, pp. 159-165.
"Auditory system", Wikipedia, Mar. 2022, 12 pages, doi: https://en.wikipedia.org/wiki/Auditory_system#Peripheral_auditory_system.
"Cochlea hair cell", NeuronBank Wiki, Jul. 2010, 3 pages, doi: http://neuronbank.org/wiki/index.php/Cochlea_hair_cell.
"Cochlea", Wikipedia, Apr. 2021, 10 pages, doi: https://en.wikipedia.org/wiki/Cochlea.
"Hearing loss", Wikipedia, Jun. 2022, 27 pages, doi: https://en.wikipedia.org/wiki/Hearing_loss#Diagnosis.
"The first step in addressing possible hearing loss in yourself or a loved one is taking a hearing assessment.", The national Hearing Test, 2025, 5 pages, doi: https://www.nationalhearingtest.org/.
Ibrahim Barakat, "Cochealer implant surgery", slideshare, 2025, 75 pages, doi: https://www.slideshare.net/slideshow/cochealer-implant-surgery/12151930.
Ryan Clement, "Cochlear Implants", Slideshare, 2025, 39 pages, doi: https://www.slideshare.net/slideshow/ge-106-final-1241035/1241035.

* cited by examiner

COCHLEAR IMPLANT SYSTEM AND METHOD

BACKGROUND

The present invention relates to hearing aids, and more specifically, to cochlear implants.

SUMMARY

According to a first embodiment of the present invention, a system includes a processor adapted to process an electric audio signal, the processor operably coupled to a transducer driver; the transducer driver operably coupled to a cochlear implant, the transducer driver arranged to receive a processed electric audio signal from the processor and transmit the processed electric audio signal to the cochlear implant; and the cochlear implant that includes an intra-cochlear region, the intra-cochlear region including electro-acoustic transducer elements adapted to vibrate in response to the processed electric audio signal, thereby providing a vibrating stimulus based on the processed electric audio signal, with the intra-cochlear region arrangeable to reside at least inside a cochlea.

In a first aspect of the first embodiment, the electro-acoustic transducer elements include microelectromechanical elements that are adapted to provide the vibrating stimulus. In a second aspect, in combination with the first embodiment and/or aspects thereof, the electro-acoustic transducer elements include piezoelectric elements that are adapted to provide the vibrating stimulus. In a third aspect, in combination with the first embodiment and/or aspects thereof, one or more of the piezoelectric elements respectively include a first conductive layer, a second conductive layer, and a dielectric layer arranged between and operably coupled to the first and second conductive layers. In a fourth aspect, in combination with the first embodiment and/or aspects thereof, one or more of the piezoelectric elements respectively include an electrode and a dielectric layer operably coupled to the electrode.

In a fifth aspect, in combination with the first embodiment and/or aspects thereof, the electro-acoustic transducer elements are arranged to selectively vibrate in response to the processed electric audio signal. In a sixth aspect, in combination with the first embodiment and/or aspects thereof, the electro-acoustic transducer elements have different resonant frequencies. In a seventh aspect, in combination with the first embodiment and/or aspects thereof, the electro-acoustic transducer elements are arranged such that the different resonant frequencies decrease in frequency from a proximal region of the cochlear implant towards a distal portion of the intra-cochlear region.

In an eighth aspect, in combination with the first embodiment and/or aspects thereof, the system further includes at least one lead that communicatively couples the transducer driver and the electro-acoustic transducer elements. In a ninth aspect, in combination with the first embodiment and/or aspects thereof, the system further includes a plurality of leads that communicatively couple the transducer driver and the electro-acoustic transducer elements, wherein a respective lead communicatively couples at least one electro-acoustic transducer element to the transducer driver.

In a tenth aspect, in combination with the first embodiment and/or aspects thereof, the system further includes a transmitter that is operably coupled to the processor and arranged to transmit the processed electric audio signal, thereby providing a transmitted processed electric audio signal; and a receiver that is operably coupled to the transmitter and arranged to receive the transmitted processed electric audio signal, the receiver arrangeable to reside along or within a head of an implantee.

In an eleventh aspect, in combination with the first embodiment and/or aspects thereof, the cochlear implant further includes a proximal region, the proximal region including further electro-acoustic transducer elements adapted to vibrate in response to the processed electric audio signal, the proximal region arrangeable to reside in, on, or outside of the cochlea or a combination thereof.

In a twelfth aspect, in combination with the first embodiment and/or aspects thereof, the processor is adapted to receive biometric data indicative of an implantee sleep state and process the electric audio signal based on the implantee sleep state. In a thirteenth aspect, in combination with the first embodiment and/or aspects thereof, a processor is adapted to attenuate the electric audio signal in response to biometric data.

In a fourteenth aspect, in combination with the first embodiment and/or aspects thereof, the system further includes an audio controller adapted to control an audio signal characteristic of the processor. In a fifteenth aspect, in combination with the first embodiment and/or aspects thereof, the system further includes an audio calibrator adapted to assign an audio frequency band to one or more of the electro-acoustic transducer elements.

In a sixteenth aspect, in combination with the first embodiment and/or aspects thereof, the electro-acoustic transducer elements are arranged to provide air-conducted sound waves, as the vibrating stimulus, in response to the processed electric audio signal.

According to a second embodiment of the present invention, a method includes receiving, by a processor, an electric audio signal; processing, by the processor, the electric audio signal, thereby providing a processed electric audio signal; receiving, by a transducer driver, the processed electric audio signal; transmitting, by the transducer driver, the processed electric audio signal to electro-acoustic transducer elements that are at least arranged within a cochlea; and vibrating at least one electro-acoustic transducer element of the electro-acoustic transducer elements in response to the at least one electro-acoustic transducer element receiving the processed electric audio signal, thereby providing a vibrating stimulus based on the processed electric audio signal.

In a first aspect of the second embodiment, the method further includes adjusting an audio signal processing characteristic of the processor based on an implantee input.

According to a third embodiment of the present invention, a method includes providing, by an audio calibrator, a calibrating audio signal; driving, by a transducer driver, a first subplurality of electro-acoustic transducer elements based on the calibrating audio signal, thereby providing a vibrating stimulus based on the calibrating audio signal, the electro-acoustic transducer elements arranged on or in a substrate that is arranged within a cochlea; driving, by the transducer driver, a second subplurality of electro-acoustic transducer elements based on the first calibrating audio signal, the second subplurality of electro-acoustic transducer elements arranged on or in a different region of the substrate than the first subplurality of electro-acoustic transducer elements; receiving, by the audio calibrator, an implantee response indicative of a perceived difference between the first subplurality and the second subplurality of electro-acoustic transducer elements that are driven the first calibrating audio signal; and assigning, by the audio calibrator, an audio frequency bandwidth to at least one of the first subplurality and the second subplurality of electro-acoustic transducer elements based on the implantee response.

DETAILED DESCRIPTION

Traditional cochlear implants replace the cochlea or a portion of it. After implantation, hair cells are directly innervated using electric impulses generated by implant electrodes, with stereocilia (e.g., hair) of the hair cells being bypassed and/or destroyed via the implant process. Such impulses differ to those induced by stereocilia movement for physiologic hearing. Thus, the implantee must re-learn how to decipher signals from the auditory nerve. Implantees initially describe the perceived sounds provided by conventional implants as “mechanical”, “technical”, or “synthetic”, and it usually takes weeks for an implantee to adjust.

In contrast, innovative embodiments may include a targeted displacement of the inner ear stereocilia via vibration from a small electro-acoustic device such as a microelectromechanical piezoelectric array (e.g., a MEMS). In response to such vibrations, auditory nerve signals may be generated by inner hair cells and more closely resemble physiologic hearing by utilizing the innate mechanism of transforming stereocilia movement into electric impulses. Direct stereocilia stimulation may provide a targeted, tuned stimulation of specific hair cells in contrast to a more generalized stimulation of the inner ear anatomy.

Figure 1:
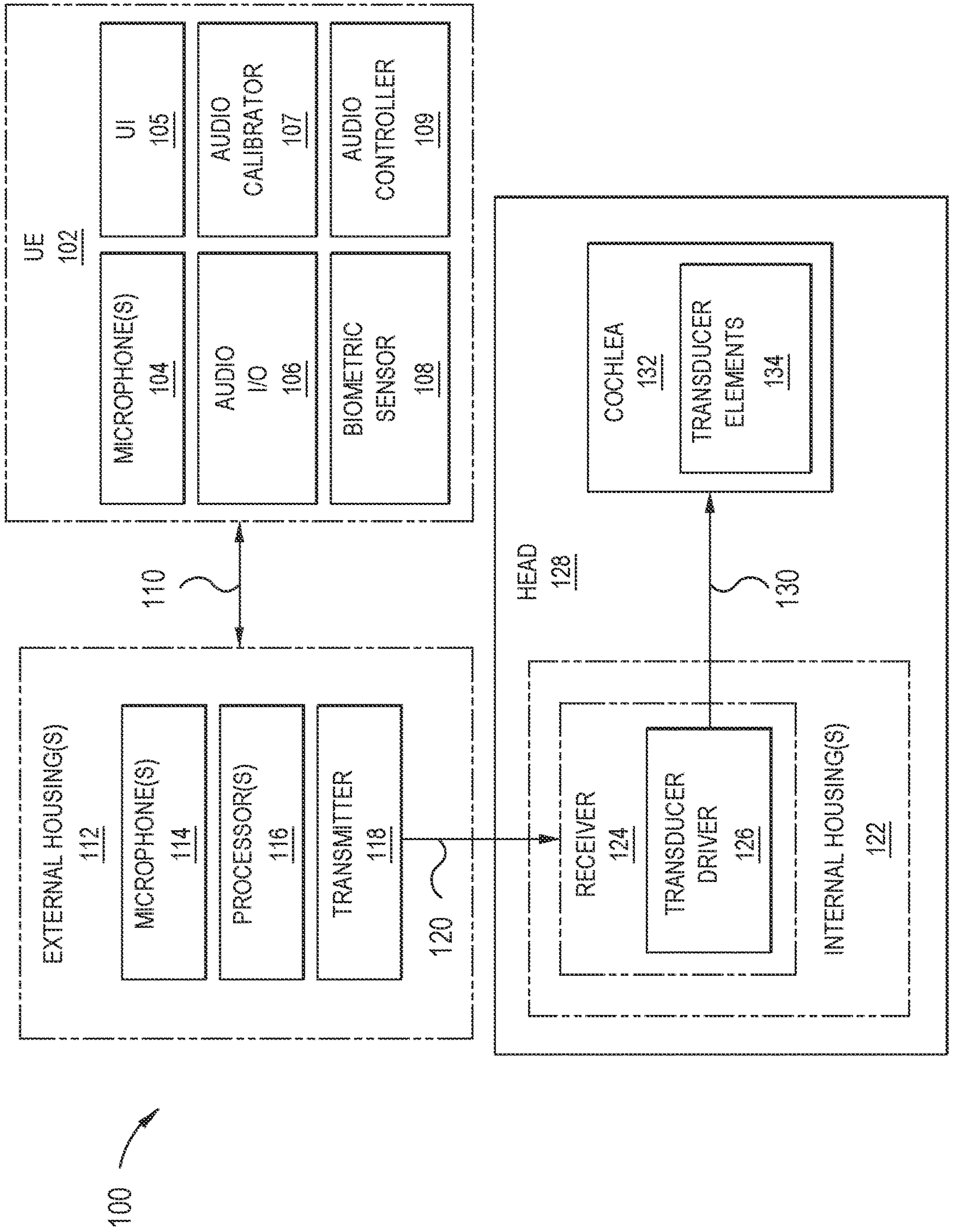
FIG. 1 depicts examples of a cochlear implant system.

With reference to FIG. 1, cochlear implant system 100 includes, in an embodiment, user equipment (UE) 102 with microphone(s) 104, audio I/O 106, biometric sensor 108, and audio controller 109. In one aspect, biometric sensor 108 provides biometric data to processor(s) 116 and/or audio controller 109. The biometric data may indicate that an implantee is asleep and/or awake. In one aspect, processor(s) 116 mute or otherwise attenuate audio signals provided by microphone(s) 104 and/or 114 such that transducer driver 126 receives a lower-level audio signal or no audio signal during a determined implantee sleep state.

UE 102 may be communicatively coupled with processor (s) 116 via communication channel 110, which may be a wired or wireless communication channel. Additionally or alternatively, processor(s) 116 receives electric audio signals from microphones 114. In some embodiments, processor(s) 116 provides processed audio signal 120 to transducer driver 126. As shown in FIG. 1, transmitter 118 provides processed audio signal 120 to receiver 124, which is operably coupled to transducer driver 126 (e.g., an amplifier).

In one aspect, external housing(s) 112 resides outside and/or on head 128 of an implantee (e.g., a human). In one aspect, internal housing(s) 122 resides inside head 128. For example, internal housing(s) 122 may be arranged between (and secured to) a cranium and skin. In one aspect, transmitter 118 wirelessly transmits processed audio signal 120 to communicatively coupled receiver 124.

In one aspect, transducer driver 126 amplifies the received processed audio signal and transmits the audio signal to electro-acoustic transducer elements 134 (generally referred to as “transducer elements”) via lead 130. In one aspect, lead 130 may be a common lead for transducer elements 134. In one aspect, lead 130 may include a plurality of leads, with each lead operably coupled to an individual element of transducer elements 134 or a subplurality (e.g., a group) of transducer elements 134. In one aspect, transducer driver 126 resides in external housing(s) 112, but it is shown in FIG. 1 that driver 126 may reside in internal housing(s) 122.

In one aspect, audio calibrator 107 assigns a frequency bandwidth to each group of transducer elements 134. In one aspect, audio calibrator 107 receives implantee input via user interface (“UI”) 105 indicating a perceived clarity, loudness and/or annoyance of an audio signal provided by a group of transducer elements 134 as said audio signal is sequentially provided by each group of transducer elements 134. In one aspect, said implantee feedback may be a part of an initial calibration process after implantation.

In one aspect, transducer elements 134 are arranged inside cochlea 132. In one aspect, transducer elements 134 are arranged to selectively vibrate in response to the transmitted processed electric audio signal, thereby providing a vibrating stimulus. In one aspect, transducer elements 134 may be indirectly or directly mechanically coupled to hair cells for transferring the vibrating stimulus.

For example, in one aspect, transducer elements 134 may be mechanically coupled to a fluid-filled cochlear duct that includes the hair cells. In one aspect, transducer elements 134 may be acoustically coupled to hair cells for providing an air-conducted sound wave to the fluid-filled cochlear duct or directly to the stereocilia as the vibrating stimulus. In one aspect, transducer elements 134 may be mechanically coupled to stereocilia for directly vibrating the hair cells.

In one aspect, transducer elements are arranged to bypass the external, outer hair cells, which are responsible for fine-tuned amplification or attenuation of the basilar membrane movement. That is, embodiments include emulating such fine-tuned amplification or attenuation via calibrating and/or limiting driving signals of specific groups of transducer elements 134.

UE 102 may be personal computing device, a smart phone, and/or a hearing-aid-specific device. UE 102, via audio controller 109, may calibrate and/or fine tune aspects of processor(s) 116, transducer driver 126, and/or transducer elements 134. In one aspect, a calibration session may include audio controller 109 causing a plurality of frequencies being produced by a sub-plurality of transducer elements 134. An implantee, in one aspect, can provide feedback via implantee input that determines which transducer elements 134 provide which audio signal frequencies.

In one aspect, audio controller 109 is adapted to assign a respective audio frequency or frequency band to a respective subplurality of transducer elements 134. This aspect provides flexibility in the positioning of transducer elements 134 within cochlea 132 because each frequency and/or frequency band may be selectively assigned, post-implant, to whichever sub-plurality of transducer elements 134 an implantee indicates is the clearest, loudest, most natural sounding, and/or least annoying.

In one aspect, further implantee input via UI 105 may cause an adjustment of an audio signal processing characteristic of 116 processor(s). For example, implantee input may be received by any one of the audio calibrator 107, audio controller 109, and processor(s) 116, which in response to the implantee input updates and/or changes an audio signal processing characteristic of processor(s) 116. From cumulative implantee input, the adjusted audio signal processing characteristic(s) is responsive to, for example, implantee annoyance or irritation of a baseline or calibrated electric audio signal input to the transducer elements 134. In one aspect, processor(s) 116 limits the electric audio signal input, on a frequency and/or frequency band basis, to absolute levels (e.g., limiter processing) to avoid overly stimulating hair cells.

In one aspect, microphone(s) 104 provide an audio signal, via audio I/O 106 and communication channel 110, to processor(s) 116. Audio I/O 106 may provide audio signals via a wired or wireless port. In one aspect, one or a combination of UI 105, audio I/O 106, audio calibrator 107, biometric sensor 108, and audio controller 109 may be implemented by a hearing aid device such as that of external housing(s) 112. For example, processors(s) 116 may implement one or both of audio calibrator 107 and audio controller 109.

Figure 2A:
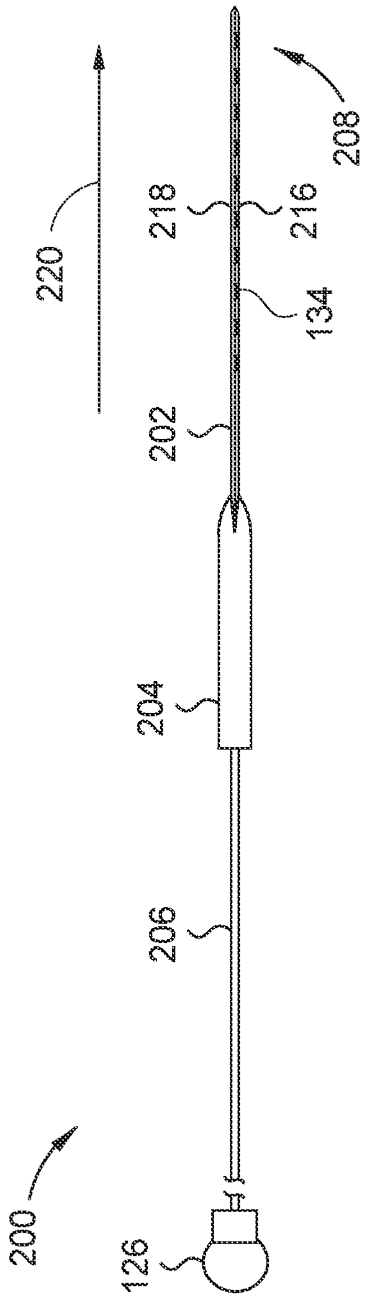
FIGS. 2A and 2B depict examples of a cochlear implant.
Figure 2B:
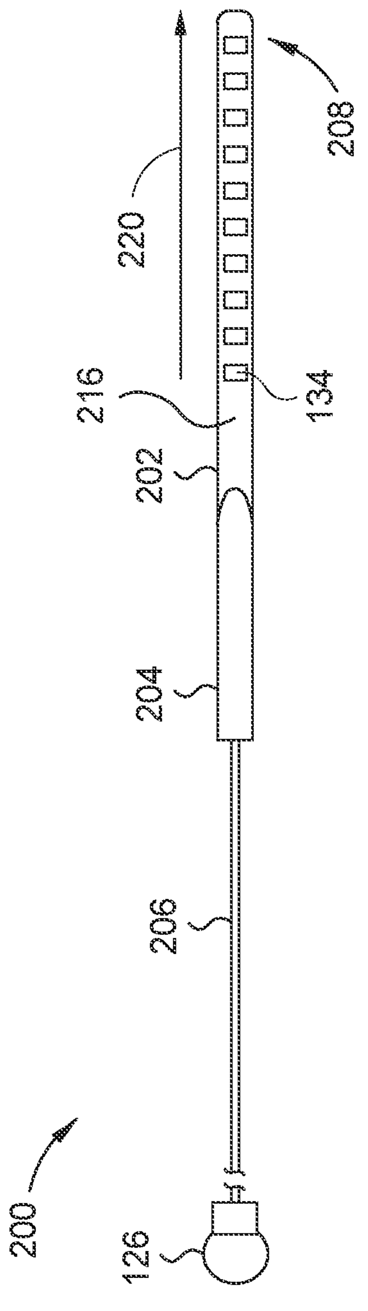

FIG. 2A is a side view of an embodiment of cochlear implant 200. FIG. 2B is a top view of cochlear implant 200. Cochlear implant 200 comprises, in one embodiment, transducer driver 126, lead 206, proximal region 204, and substrate 202. Substrate 202 defines a distal end 208, which is dimensioned to be implanted furthest into cochlea 132. In one aspect, proximal region 204 is dimensioned to reside partially in and partially outside of cochlea 132. In one aspect, proximal region 204 mechanically couples with a cochleostomy and/or round window opening of cochlea 132. In one aspect, proximal region 204 is dimensioned to reside mostly or entirely within cochlea 132.

Transducer elements 134 are arranged along substrate 202. Proximal region 204 may be mechanically coupled to lead 206. Lead 206 may physically and electrically connect transducer elements 134 with transducer driver 126.

When implanted in an implantee, the active surface 216 of substrate 202 faces the interior of cochlea 132. For example, transducer elements 134 may, when implanted, face stereocilia and may be mechanically and/or acoustically coupled thereto. The opposing side of substrate 202, passive surface 218, may face an external wall and bony capsule (not shown) of cochlea 132. "Active surface" may refer to the surfaces, features, and directions that face toward the center of cochlea 132, wherein hair cells are generally arranged. In contrast, "passive surface" may refer to surfaces, features and directions that face toward the exterior of cochlea 132.

In one aspect, a plurality of spaced transducer elements 134 are arranged on or in substrate 202 as an array. Transducer elements 134 may be arranged in a linear (e.g., equally spaced) or non-linear sequence on or in substrate 202. In one aspect, transducer elements 134 may be position so to be acoustically coupled with predetermined, respective regions of tonotopically mapped cochlea 132. In one aspect, transducer elements 134 provide specific audio frequency bands, with transducer elements 134 providing decreasingly lower frequencies along direction 220.

In one aspect, transducer elements 134 that are arranged closer to proximal region 204 provide higher frequencies than transducer elements 134 that are arranged further away from proximal region 204 and/or closer to distal end 208. In one aspect, transducer elements 134 that are arranged closer to proximal region 204 have higher resonant frequencies than transducer elements 134 that are arranged further away from proximal region 204 and/or closer to distal end 208, which have lower resonant frequencies.

Figure 3:
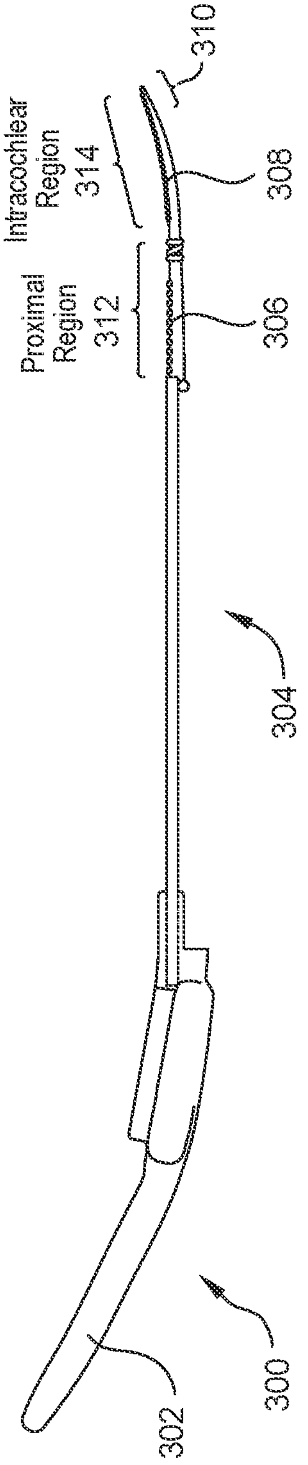
FIG. 3 depicts an example of a cochlear implant.

FIG. 3 shows an embodiment of cochlear implant 300, which include interior enclosure(s) 302, lead 304, optional transducer elements 306, and transducer elements 308 that are respectively arranged in or on proximal region 312 and intra-cochlear region 314, which includes distal portion 310. In one aspect, intra-cochlear region 314 includes proximal region 312. In one aspect, proximal region 312 may partially or entirely reside within cochlea 132. In one aspect, intra-cochlear region 314 includes most or all of transducer elements 308. For example, in one aspect, cochlear implant 300 does not include optional transducer elements 306 or other transducer elements on or in proximal region 312.

In one aspect, the length of intra-cochlear region 314 may be based on an implantee's cochlear duct length (CDL). CDL may be the length of cochlear duct measured from the natural or surgically provided entrance of the cochlea to the helicotrema. In one aspect, intra-cochlear region 314 may be around 20 to 40 millimeters.

Figure 4:
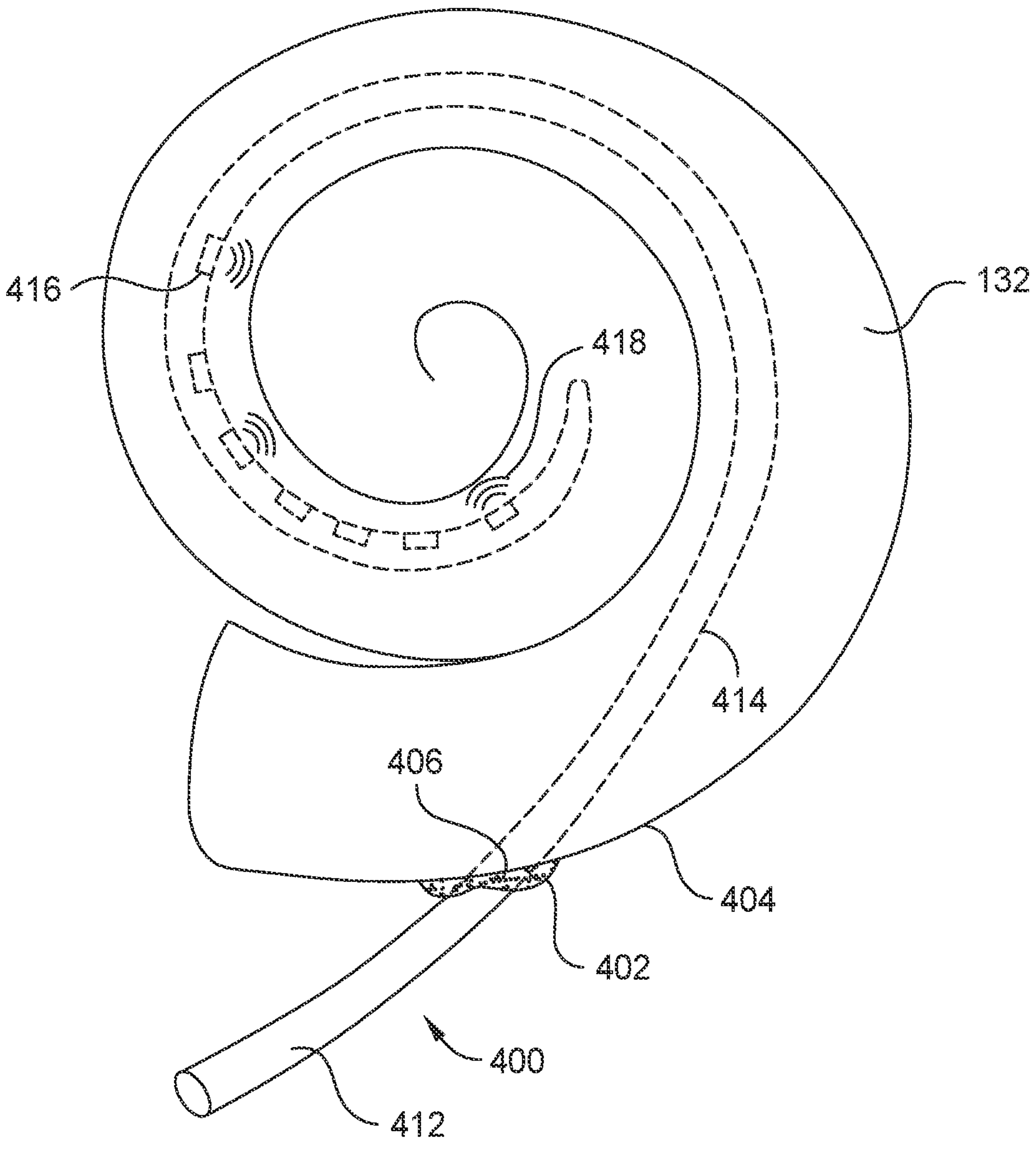
FIG. 4 depicts an example of a cochlear implant.

FIG. 4 is a schematic view of cochlea 132, with an embodiment intra-cochlear region 414 of cochlear implant 400 arranged therein. Graft 402 is positioned around proximal region 412 over cochleostomy 406. In one aspect, cochleostomy 406 is sealed using graft 402 of an implantee's tissue, which is typically muscle and fat. In one aspect, cochleostomy 406 is arranged on and/or in an exterior wall 404 of cochlea 132. Alternatively or additionally, a cochlear implant includes a proximal region that is dimensioned to directly seal cochlea 132, without graft 402, such as proximal region 204 of FIGS. 2A and 2B.

Intra-cochlear region 414 includes transducer elements 416 that are configured to provide vibrating stimulus 418 in response to audio signals received by a driver (not shown).

Figure 5:
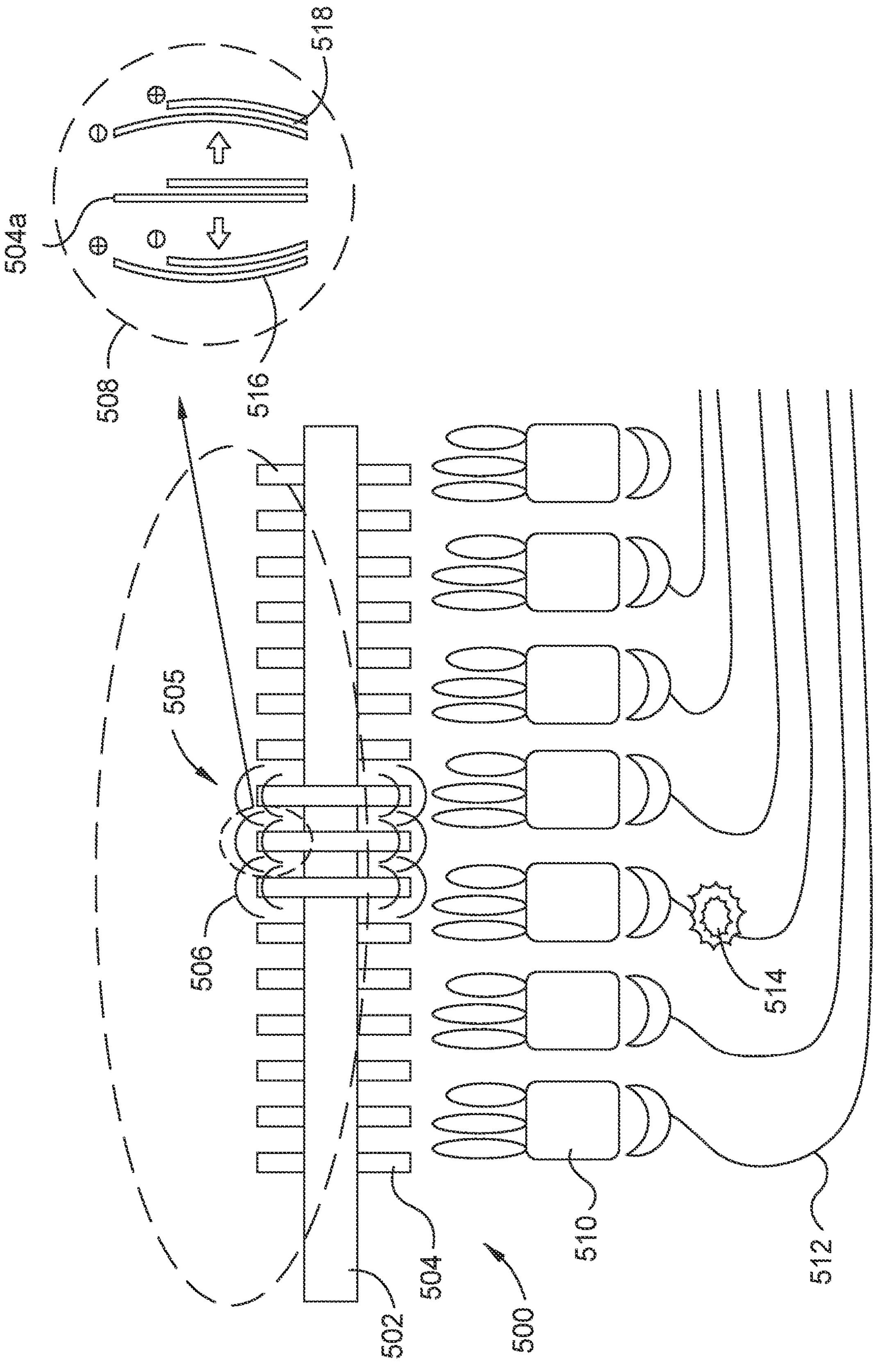
FIG. 5 depicts an example of a cochlear implant.

FIG. 5 is a schematic view of cochlear implant 500, which is arranged to provide vibrating stimulus 506 for stimulating hair cells 510. In one aspect, group 505 of elongated piezoelectric elements 504 vibrate in response to a calibration-determined band of audio frequencies. Hair cells 510 near group 505 are stimulated and typically provide a signal via auditory nerves 512. Although auditory nerve 514 may be damaged, the adjacent hair cells 510 can still provide a signal via auditory nerves 512. As shown in enlarged detail 508, individual piezoelectric element 504*a* laterally vibrates, with respect to substrate 502, between deformed positions 516 and 518 via the inverse piezoelectric effect.

Figure 6:
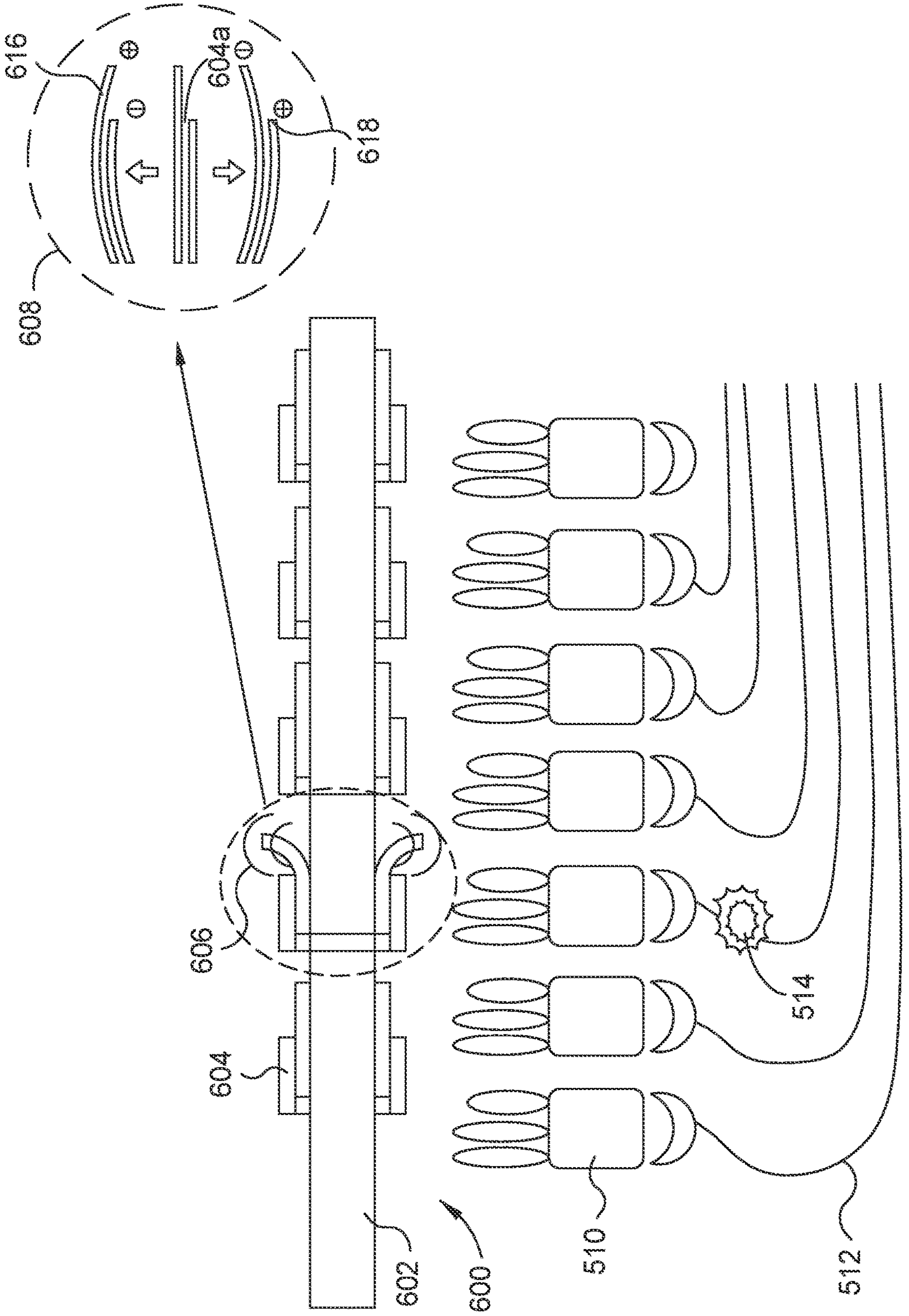
FIG. 6 depicts an example of a cochlear implant.

FIG. 6 is a schematic view of cochlear implant 600, which is arranged to provide vibrating stimulus 606 for stimulating for hair cells 510. In one aspect, planar piezoelectric elements 604 each vibrate in response to a calibration-determined band of audio frequencies for stimulating hair cells 510. Although auditory never 514 may be damaged, the adjacent hair cells 510 can still provide a signal via other auditory nerves 512. As shown in enlarged detail 608, individual piezoelectric element 604*a* vertically vibrates, with respect to substrate 602, between deformed positions 616 and 618 via the inverse piezoelectric effect.

Figure 7:
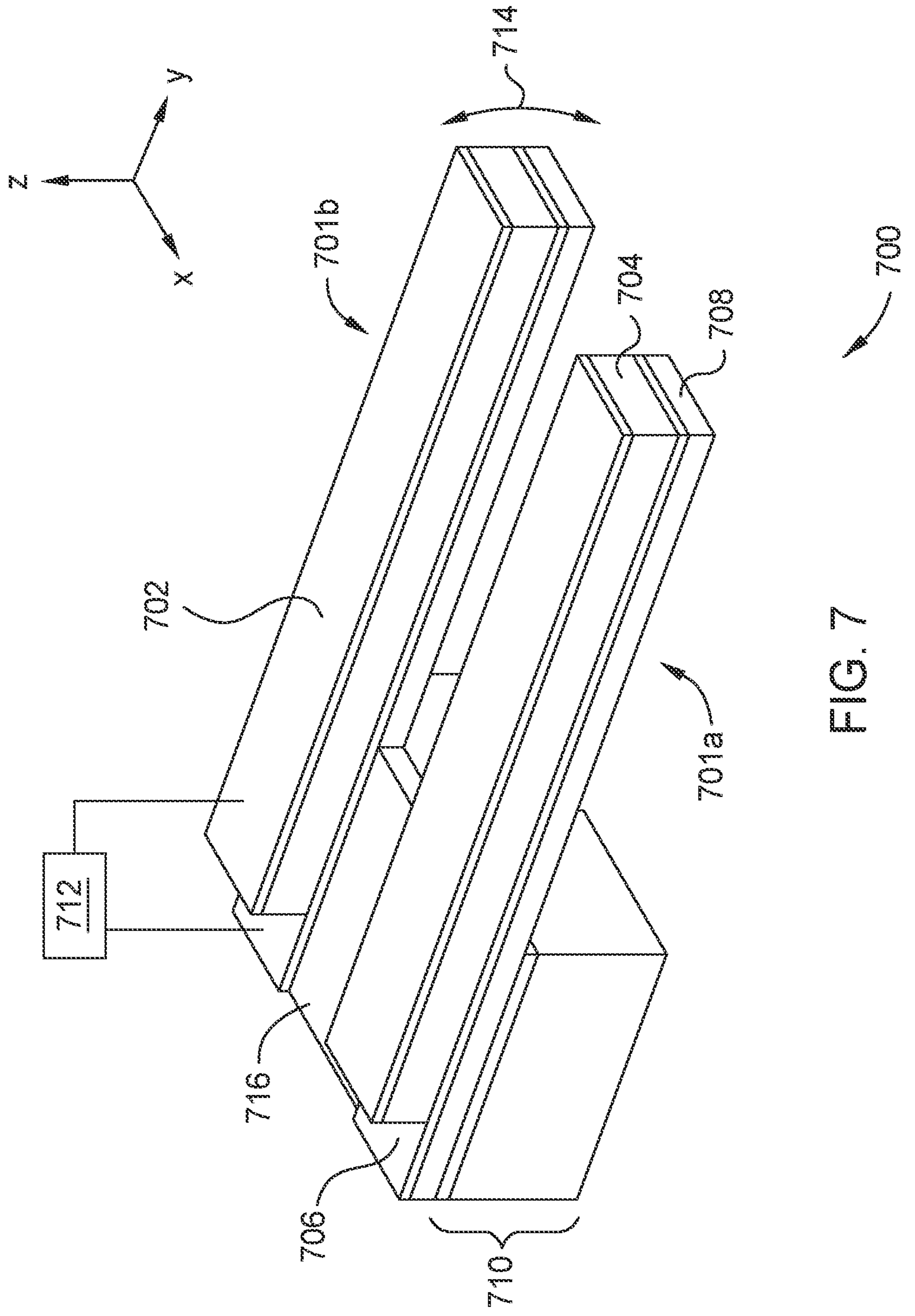
FIG. 7 depicts an example of a cochlear implant.

FIG. 7 is a schematic view of cochlear implant 700, which, in an embodiment, includes cantilever piezoelectric elements 701*a* and 701*b*, main substrate 710, transducer driver 712, and spacer 716. In one aspect, each cantilever piezoelectric element 701*a* and 701*b* includes top electrode 702, dielectric 704, bottom electrode 706, and cantilever substrate 708. Cantilever piezoelectric elements 701*a* and 701*b* collectively vibrate and/or separately vibrate vertically (e.g., along the z-axis), with respect to main substrate 710, along path 714 in response to receiving a driving signal from transducer driver 712. In one aspect, spacer 716 may electrically isolate cantilever piezoelectric element 701*a* from cantilever piezoelectric element 701*b*.

Figure 8B:
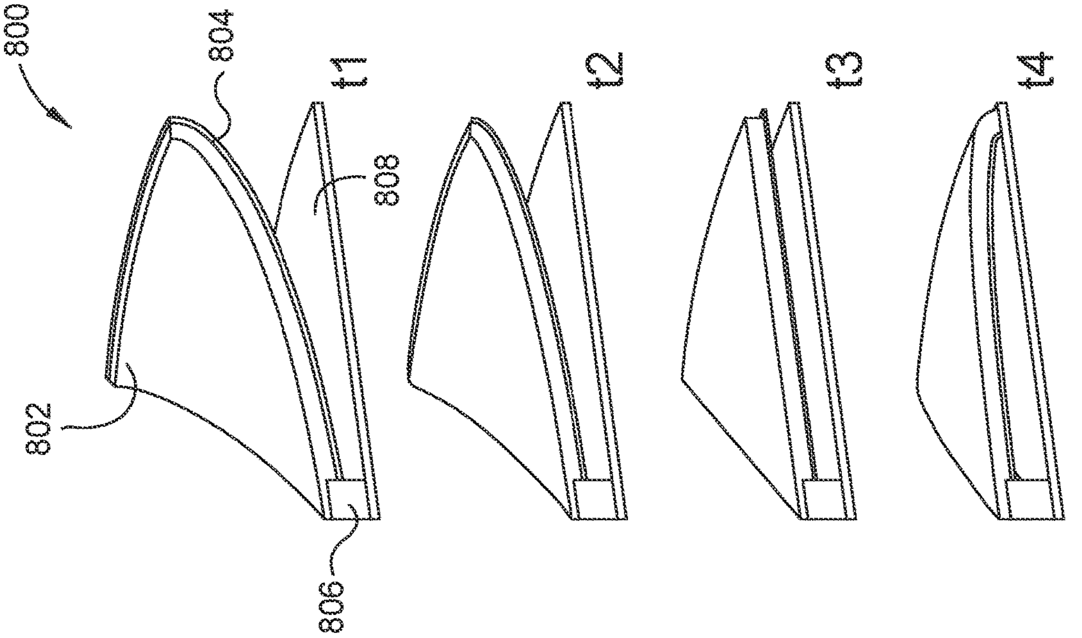
FIGS. 8A and 8B depict an example planar piezoelectric element.
Figure 8A:
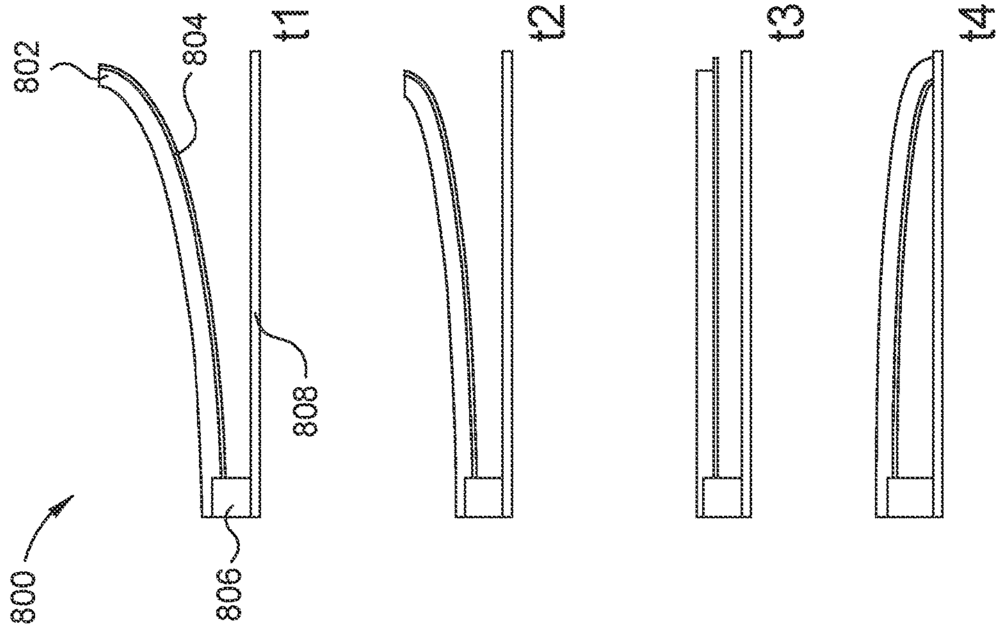

FIG. 8A is a side view of planar piezoelectric element 800 and FIG. 8B is a perspective view of planar piezoelectric 800 at different deformation states for providing the vibrating stimulus. In one embodiment, planar piezoelectric element 800 includes conductive layer 802, first dielectric layer 804, dielectric anchor 806, and second dielectric layer 808. In one aspect, conductive layer 802 may include gold and first dielectric layer 804, dielectric anchor 806, and second dielectric layer 808 may each include polysilicon. At time t1, planar piezoelectric element 800 is deformed at a maximum distance away from second dielectric layer 808. At time t2, less so, and at time t3 planar piezoelectric element 800 is in a neutral position, which corresponds to the position that planar piezoelectric element 800 may be arranged without receiving a driving signal. At time t4, planar piezoelectric element 800 is deformed towards second dielectric layer 808.

Figure 9:
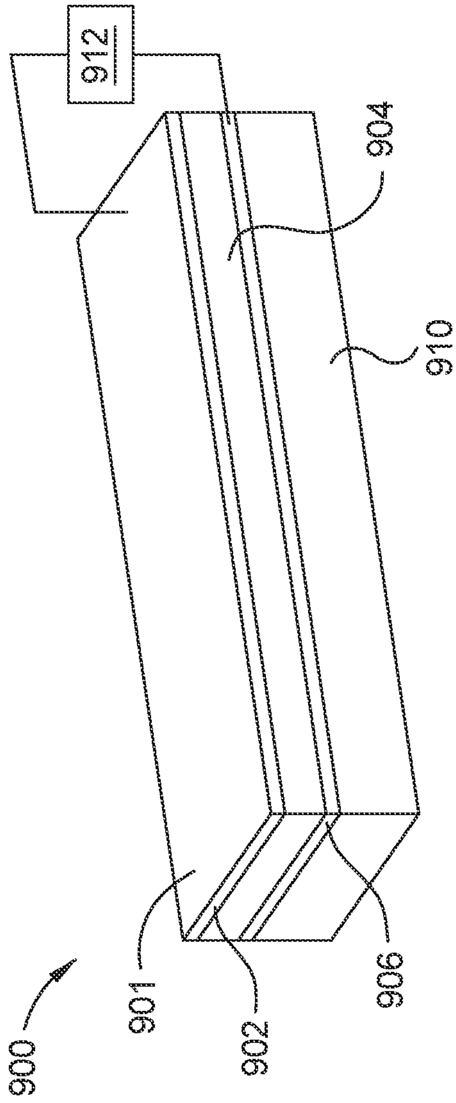
FIG. 9 depicts an example of a cochlear implant.

FIG. 9 is a perspective view of cochlear implant 900, which includes, in an embodiment, planar piezoelectric element 901 and transducer driver 912. Planar piezoelectric element 901 may include first electrode 902 (e.g., a conductive layer), dielectric layer 904, second electrode 906, and substrate 910. In one aspect, dielectric layer 904 includes at least one of a non-conductive piezoelectric ceramic and a non-conductive piezoelectric crystal. In one aspect, dielectric layer 904 includes lead zirconate titanate. In one aspect, planar piezoelectric element 901 vibrates vertically, with respect to substrate 910, in response to receiving a driving signal (e.g., a processed audio signal) from transducer driver 912.

Figure 10:
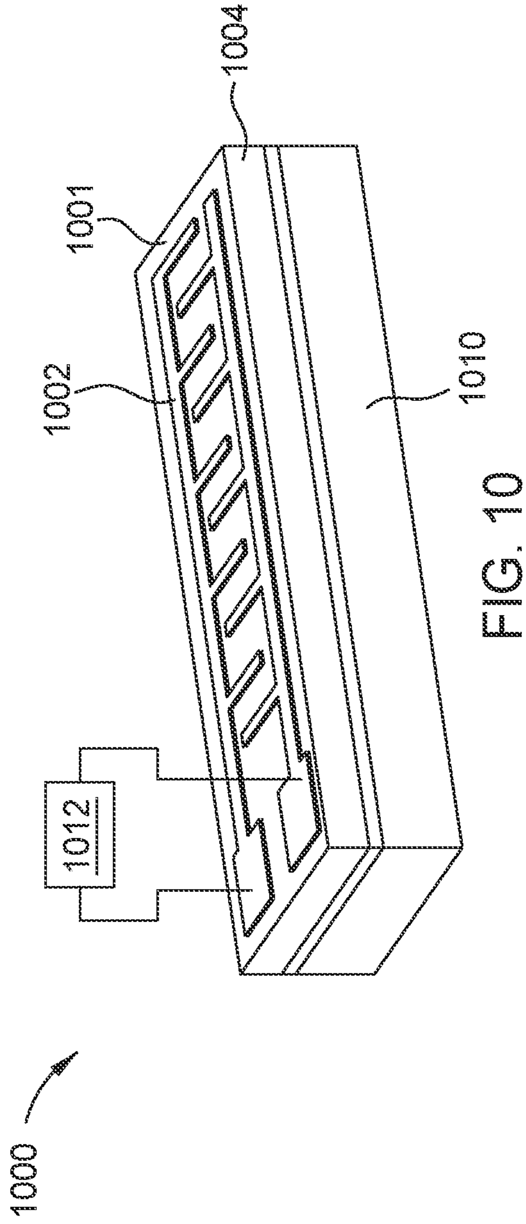
FIG. 10 depicts an example of a cochlear implant.

FIG. 10 is a perspective view of cochlear implant 1000, which includes, in an embodiment, planar piezoelectric element 1001 and transducer driver 1012. Planar piezoelectric element 1001 may include interdigitated electrodes 1002, dielectric layer 1004, and substrate 1010. In one aspect, planar piezoelectric element 1001 vibrates laterally, with respect to substrate 1010, in response to receiving a driving signal (e.g., a processed audio signal) from transducer driver 1012.

Figure 11:
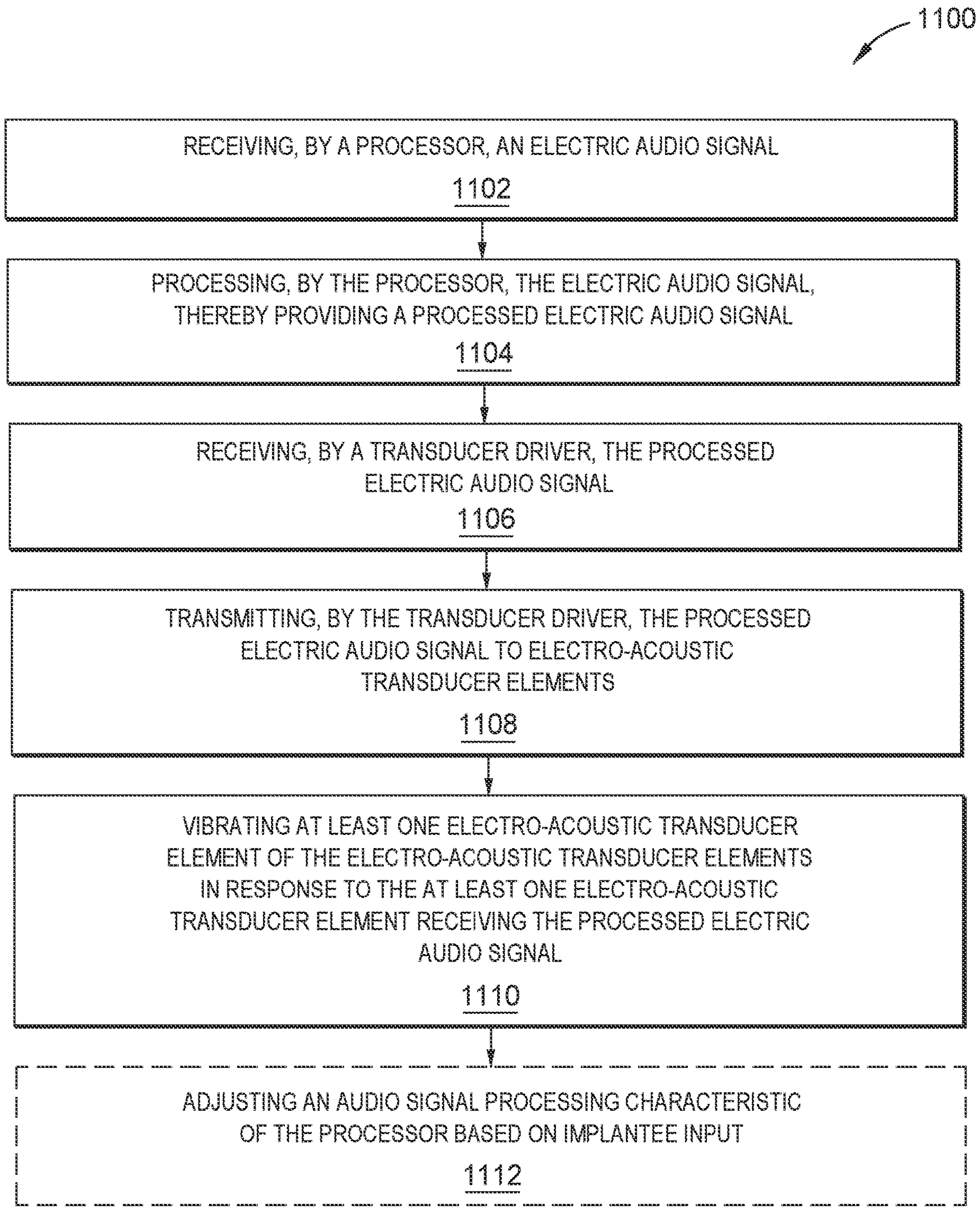
FIG. 11 depicts an example method for a cochlear implant.

FIG. 11 shows method 1100, which includes, in an embodiment, the blocks shown. Block 1102 includes receiving, by a processor, an electric audio signal. The electric audio signal may be provided by an operably coupled microphone and/or microphone array of a hearing aid and/or an external device such as consumer electronic user equipment (e.g., a smart phone). In one aspect, user equipment provides music and/or a calibration or test tones as the electric audio signal.

Block 1104 includes processing, by the processor, the electric audio signal, thereby providing a processed electric audio signal. In one aspect, the processor may convert an analog audio signal into a digital audio signal. In one aspect, the processor may apply digital signal processing for equalization, amplification, and/or attenuation (e.g., muting an audio signal). In one aspect, the processor conditions or optimizes the electric audio signal for a receiver and/or electro-acoustic transducer elements.

In one aspect, microphones may provide the processor with audio signals that are beyond the normal hearing range of human hearing (e.g., above ca. 22 kHz and/or below 20 Hz). In one aspect, the processor may translate high-frequency audio signals into a lower, perceivable frequency. For example, the processor may convert a 40 kHz signal into a 20 Khz signal, thereby effectively extending a human implantee's hearing perception range. In one aspect, the processor may translate low-frequency audio signals into a higher, perceivable frequency. For example, the processor may convert a 10 Hz signal into a 50 Hz signal, thereby effectively extending a human implantee's hearing perception range.

Block 1106 includes receiving, by a transducer driver, the processed electric audio signal. In one aspect, the processor may externally reside on an implantee's head whereas the transducer driver may reside between an implantee's skin and cranium. In one aspect, both the processor and transducer driver may reside on or near an exterior surface of an implantee's head. Block 1108 includes transmitting, by the transducer driver, the processed electric audio signal to electro-acoustic transducer elements. In one aspect, the transducer driver increases a current and/or voltage of the processed electric signal (e.g., amplification) to further condition the processed audio signal as a driver signal for an array of electro-acoustic transducer elements.

Block 1110 includes vibrating at least one electro-acoustic transducer element of the cochlear implant electro-acoustic transducer elements in response to the at least one electro-acoustic transducer element receiving the processed electric audio signal, thereby providing a vibrating stimulus, within the cochlear, based on the processed electric audio signal. In one aspect, a driver may vibrate a specific group of transducer elements according to the group's "assigned" audio frequency band. For example, one group of transducers may be provided signals between 1 kHz to 2 kHz and a neighboring and/or overlapping group of transducers may receive frequencies between 2 kHz and 3 kHz.

Block 1112 includes adjusting an audio signal processing characteristic of the processor based on implantee input. For example, the adjustment may be in response to the implantee input. In one aspect, the adjusted audio signal processing characteristic(s) is responsive to, for example, implantee annoyance or irritation of a baseline or calibrated electric audio signal input, as indicated by implantee input. In one aspect, an adjust characteristic may be an absolute limit of the processed audio signal, on a frequency and/or frequency band basis, (e.g., limiter processing) to avoid overly stimulating hair cells.

Figure 12:
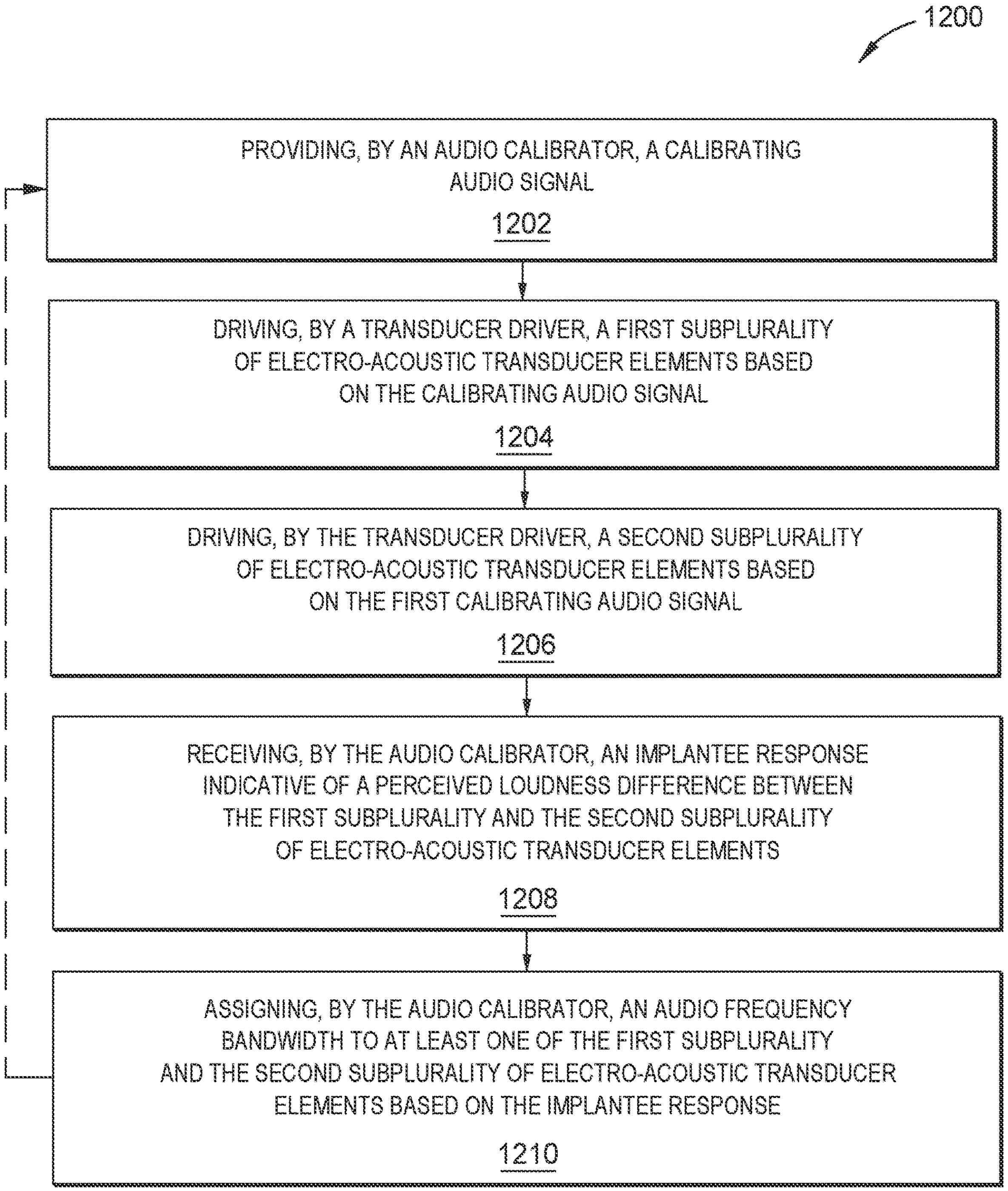
FIG. 12 depicts an example method for a cochlear implant.

FIG. 12 shows method 1200, which includes, in an embodiment, the blocks shown. Block 1202 includes providing, by an audio calibrator, a calibrating audio signal. In one aspect, the calibrating audio signal is a sine wave of a particular frequency. In one aspect, the calibrating audio signal includes multiple audio frequencies. In one aspect, the calibrating audio signal is a sweeping audio signal that increases or decreases the audio signal frequency over time. In one aspect, after block 1210, the calibrating audio signal may change the signal frequency, signal amplitude, signal type, or other signal aspect of the calibrating audio signal for providing a calibration sequence of, for example, differing audio signal frequencies.

Block 1204 includes driving, by a transducer driver, a first subplurality of electro-acoustic transducer elements based on the calibrating audio signal, thereby providing a vibrating stimulus based on the calibrating audio signal. In one aspect, the electro-acoustic transducer elements are arranged on or in a substrate and the substrate is arranged on and/or within a cochlea.

Block 1206 includes driving, by the transducer driver, a second subplurality of electro-acoustic transducer elements based on the first calibrating audio signal, with the second subplurality of electro-acoustic transducer elements arranged on or in a different region of the substrate than the first subplurality of electro-acoustic transducer elements. For example, the first subplurality of transducers may be neighboring and/or overlapping with the second subplurality of transducers. That is, in some aspects, a transducer element may be included in both the first and second subpluralities, but, in other aspects, each subplurality may include a unique group of transducers.

Block 1208 includes receiving, by the audio calibrator, an implantee response that is indicative of a perceived difference between the first subplurality and the second subplurality of electro-acoustic transducer elements, with each subplurality respectively driven by the first calibrating audio signal. In one aspect, a test calibration signal provides an A/B test, with the test being a comparison of the relative perceived performance of differing electro-acoustic transducer groups, whereby an implantee indicates which transducer group provided the clearest, loudest, most natural sounding, and/or least annoying sound.

Block 1210 includes assigning, by the audio calibrator, an audio frequency bandwidth to at least one of the first subplurality and the second subplurality of electro-acoustic transducer elements based on the implantee response. In one aspect, the audio calibrator configures the processor and/or transducer driver such that specific audio frequencies are provided to specific electro-acoustic transducer elements. In one aspect, method 1200 returns to block 1202 for providing a further calibration sequence, as discussed above.

Figure 13:
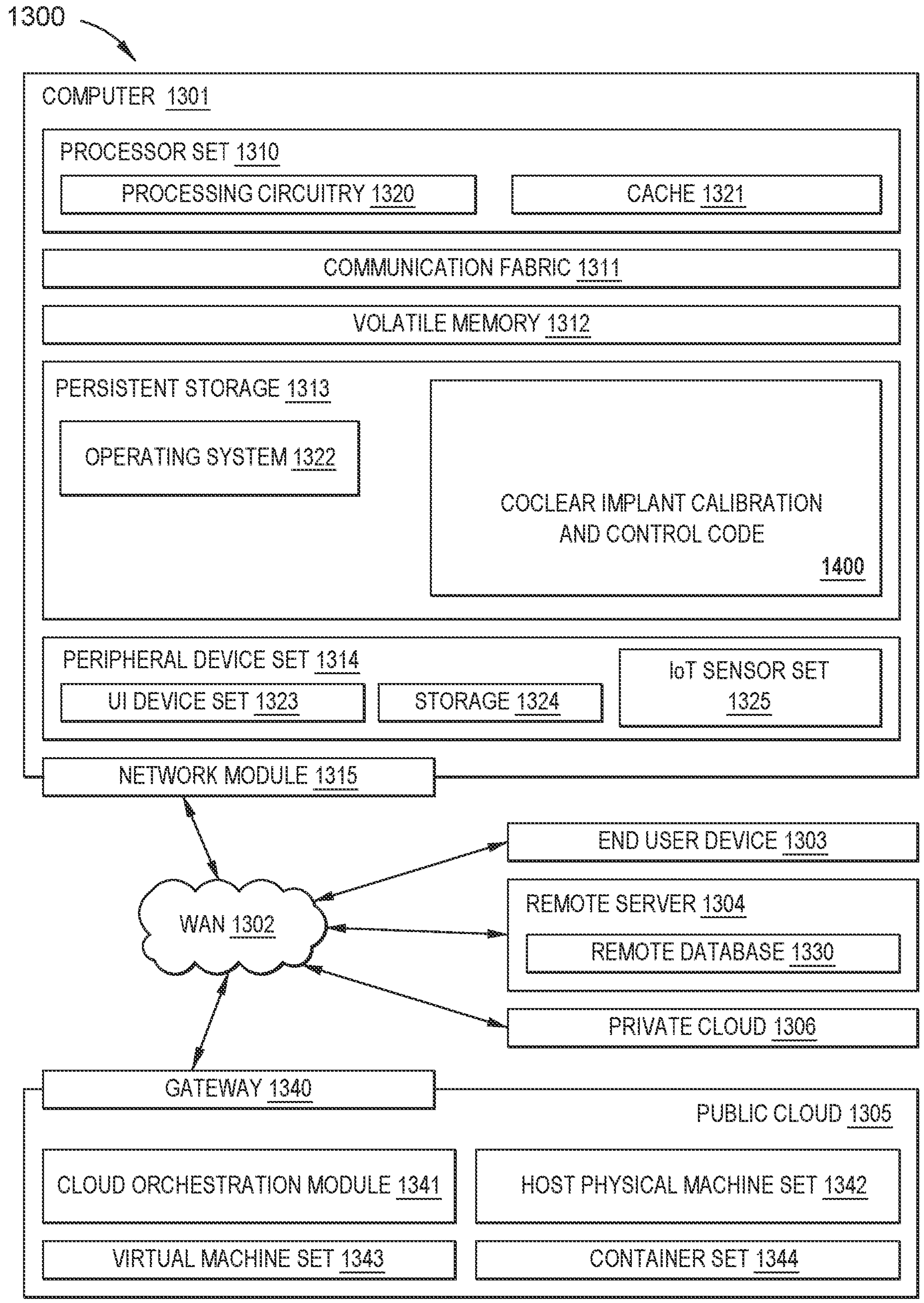
FIG. 13 depicts an example computing environment.

With reference to FIG. 13, computing environment 1300 contains an example of an environment for the execution of at least some of the computer code involved in performing the inventive methods, such as cochlear implant calibration and control code block 1400. In addition to block 1400, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1400, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 13. On the other hand, computer 1301 is not required to be in a cloud except to any extent as may be affirmatively indicated.

PROCESSOR SET 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in block 1400 in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface-type operating systems that employ a kernel. The code included in block 1400 typically includes at least some of the computer code involved in performing the inventive methods.

PERIPHERAL DEVICE SET 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

NETWORK MODULE 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on.

REMOTE SERVER 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media.

As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A system, comprising:

a processor adapted to process an electric audio signal, the processor operably coupled to a transducer driver;

the transducer driver operably coupled to a cochlear implant, the transducer driver arranged to receive a processed electric audio signal from the processor and transmit the processed electric audio signal to the cochlear implant;

the cochlear implant comprising an intra-cochlear region, the intra-cochlear region comprising electro-acoustic transducer elements adapted to vibrate in response to the processed electric audio signal, thereby providing a vibrating stimulus based on the processed electric audio signal, the intra-cochlear region arrangeable to reside at least inside a cochlea; and an audio calibrator, the audio calibrator configured to assign an audio frequency bandwidth to at least one of the electro-acoustic transducer elements based on an implantee response, the response indicative of a perceived difference between two or more electro-acoustic transducer elements that are driven a calibrating audio signal.

2. The system of claim 1, wherein the electro-acoustic transducer elements comprise microelectromechanical elements that are adapted to provide the vibrating stimulus.

3. The system of claim 1, wherein the electro-acoustic transducer elements comprise piezoelectric elements that are adapted to provide the vibrating stimulus.

4. The system of claim 3, wherein one or more of the piezoelectric elements respectively comprise a first conductive layer, a second conductive layer, and a dielectric layer arranged between and operably coupled to the first and second conductive layers.

5. The system of claim 3, wherein one or more of the piezoelectric elements respectively comprise an electrode and a dielectric layer operably coupled to the electrode.

6. The system of claim 1, wherein the electro-acoustic transducer elements are arranged to selectively vibrate in response to the processed electric audio signal.

7. The system of claim 1, wherein the electro-acoustic transducer elements have different resonant frequencies.

8. The system of claim 7, wherein the electro-acoustic transducer elements are arranged such that the different resonant frequencies decrease in frequency from a proximal region of the cochlear implant towards a distal portion of the intra-cochlear region.

9. The system of claim 1, further comprising at least one lead that communicatively couples the transducer driver and the electro-acoustic transducer elements.

10. The system of claim 1, further comprising a plurality of leads that communicatively couple the transducer driver and the electro-acoustic transducer elements, wherein a respective lead communicatively couples at least one electro-acoustic transducer element to the transducer driver.

11. The system of claim 1, further comprising:

a transmitter that is operably coupled to the processor and arranged to transmit the processed electric audio signal, thereby providing a transmitted processed electric audio signal; and a receiver that is operably coupled to the transmitter and arranged to receive the transmitted processed electric audio signal, the receiver arrangeable to reside along or within a head of an implantee.

12. The system of claim 1, wherein the cochlear implant further comprising a proximal region, the proximal region comprising further electro-acoustic transducer elements adapted to vibrate in response to the processed electric audio signal, the proximal region arrangeable to reside in, on, or outside of the cochlea or a combination thereof.

13. The system of claim 1, wherein the processor is adapted to receive biometric data indicative of an implantee sleep state and process the electric audio signal based on the implantee sleep state.

14. The system of claim 13, wherein the processor is adapted to attenuate the electric audio signal in response to the biometric data.

15. The system of claim 1, further comprising an audio controller adapted to control an audio signal characteristic of the processor.

16. The system of claim 1, wherein to assign an audio frequency, the audio calibrator is configured to:

provide the calibrating audio signal to the two or more electro-acoustic transducer elements, wherein the two are more electro-acoustic transducer elements are each arranged on or in a different region on or in a substrate within the cochlea;

receive the implantee response; and assign an audio frequency bandwidth to at least one of the two or more electro-acoustic transducer elements based on the implantee response.

17. The system of claim 1, wherein the electro-acoustic transducer elements are arranged to provide air-conducted sound waves, as the vibrating stimulus, in response to the processed electric audio signal.

18. A method comprising:

receiving, by a processor, an electric audio signal;

processing, by the processor, the electric audio signal, thereby providing a processed electric audio signal;

receiving, by a transducer driver, the processed electric audio signal;

transmitting, by the transducer driver, the processed electric audio signal to electro-acoustic transducer elements that are at least arranged within a cochlea; and vibrating at least one electro-acoustic transducer element of the electro-acoustic transducer elements in response to the at least one electro-acoustic transducer element receiving the processed electric audio signal, thereby providing a vibrating stimulus based on the processed electric audio signal; and adjusting an audio signal processing characteristic of the processor based on an implantee input, wherein the implantee input is indicative of a perceived difference between the at least one electro-acoustic transducer element and at least one secondary electro-acoustic transducer element, and wherein adjusting an audio signal processing characteristic includes assigning an audio frequency bandwidth to the at least one electro-acoustic transducer element based on the implantee input.

19. The method of claim 18, wherein adjusting the audio signal processing characteristic of the processor comprises:

providing a calibrating audio signal to the at least one electro-acoustic transducer element and at least one secondary electro-acoustic transducer element, wherein the at least one electro-acoustic transducer element and at least one secondary electro-acoustic transducer element are each arranged on or in a different region on or in a substrate within the cochlea;

receiving the implantee response; and assigning an audio frequency bandwidth to the at least one electro-acoustic transducer element based on the implantee input.

20. A method comprising:

providing, by an audio calibrator, a calibrating audio signal;

driving, by a transducer driver, a first subplurality of electro-acoustic transducer elements based on the calibrating audio signal, thereby providing a vibrating stimulus based on the calibrating audio signal, the electro-acoustic transducer elements arranged on or in a substrate that is arranged within a cochlea;

driving, by the transducer driver, a second subplurality of electro-acoustic transducer elements based on the first calibrating audio signal, the second subplurality of electro-acoustic transducer elements arranged on or in a different region of the substrate than the first subplurality of electro-acoustic transducer elements;

receiving, by the audio calibrator, an implantee response indicative of a perceived difference between the first subplurality and the second subplurality of electro-acoustic transducer elements that are driven the first calibrating audio signal; and assigning, by the audio calibrator, an audio frequency bandwidth to at least one of the first subplurality and the second subplurality of electro-acoustic transducer elements based on the implantee response.

* * * * *